United States Patent
Balzer

(10) Patent No.: US 6,612,106 B2
(45) Date of Patent: Sep. 2, 2003

(54) SEGMENTED MIXING DEVICE HAVING CHEVRONS FOR EXHAUST NOISE REDUCTION IN JET ENGINES

(75) Inventor: Ronald L. Balzer, Bothell, WA (US)

(73) Assignee: The Boeing Company, Seattle, WA (US)

( * ) Notice: Subject to any disclaimer, the term of this patent is extended or adjusted under 35 U.S.C. 154(b) by 74 days.

(21) Appl. No.: 09/822,962

(22) Filed: Mar. 30, 2001

(65) Prior Publication Data

US 2001/0035004 A1 Nov. 1, 2001

Related U.S. Application Data

(60) Provisional application No. 60/203,222, filed on May 5, 2000.

(51) Int. Cl.[7] .................................................. F02K 1/00
(52) U.S. Cl. ....................... 60/204; 60/770; 239/265.17; 181/206
(58) Field of Search ........................... 60/204, 262, 264, 60/770; 239/265.17, 265.19; 181/206, 220

(56) References Cited

U.S. PATENT DOCUMENTS

| 3,055,174 A | | 9/1962 | Grotz et al. ................. 60/35.6 |
|---|---|---|---|
| 3,351,155 A | | 11/1967 | Hoch et al. ..................... 181/51 |
| 4,175,640 A | | 11/1979 | Birch et al. .................. 181/213 |
| 4,194,706 A | | 3/1980 | Detalle ....................... 244/3.23 |
| 4,284,170 A | | 8/1981 | Larson et al. ................ 181/213 |
| 4,298,178 A | | 11/1981 | Birch et al. .................. 181/213 |
| 4,311,291 A | * | 1/1982 | Gilbertson et al. ........... 239/566 |
| 4,401,269 A | | 8/1983 | Eiler ............................. 239/265 |
| 4,543,784 A | | 10/1985 | Kirker ........................... 60/262 |
| 4,576,002 A | | 3/1986 | Mavrocostas ................. 60/262 |
| 4,592,201 A | * | 6/1986 | Dusa et al. ..................... 60/262 |
| 5,450,720 A | | 9/1995 | Vuillamy et al. .............. 60/271 |
| 5,706,651 A | | 1/1998 | Lillibridge et al. ............ 60/262 |
| 5,771,681 A | | 6/1998 | Rudolph ........................ 60/262 |
| 5,906,097 A | | 5/1999 | Hebert et al. ............... 60/226.1 |
| 5,924,632 A | | 7/1999 | Seiner et al. ............. 239/265.19 |
| 6,082,635 A | * | 7/2000 | Seiner et al. ............. 239/265.19 |
| 6,314,721 B1 | * | 11/2001 | Mathews et al. .............. 60/264 |
| 6,360,528 B1 | * | 3/2002 | Brausch et al. ............... 60/262 |

FOREIGN PATENT DOCUMENTS

| DE | 1015270 | 9/1957 |
|---|---|---|
| EP | 0913567 | 5/1999 |
| EP | 0984152 | 3/2000 |
| EP | 0999358 | 5/2000 |
| GB | 598947 | 8/1944 |
| GB | 1603944 | 12/1981 |
| GB | 2289921 | 12/1995 |
| GB | 2355766 | 5/2001 |

OTHER PUBLICATIONS

"Silence Please" Aircraft and the Environment Flight International 20 Oct. 26, 1999 pp. 46, 47, and 50.

* cited by examiner

Primary Examiner—Charles G. Freay
Assistant Examiner—John F. Belena
(74) Attorney, Agent, or Firm—Conrad O. Gardner

(57) ABSTRACT

Disclosed is a means for reducing jet engine exhaust noise wherein mixing is enhanced between adjacent exhaust flows and between exhaust flow and free-stream flow. The device does so with a very small degradation in aircraft performance. The device is a segmented, triangular or trapezoidal shaped, curved extension to a nozzle's sleeve that results in a serrated trailing edge. The nozzle extensions enhance the natural free mixing of the jet's exhaust flows and therefore reduce the acoustic energy associated with the velocity differences between the streams in which they are imbedded. The novel structure forces adjacent flows to penetrate into one another to a greater depth than that achievable with free mixing and results in a more uniform flow in a shorter stream wise distance.

1 Claim, 3 Drawing Sheets

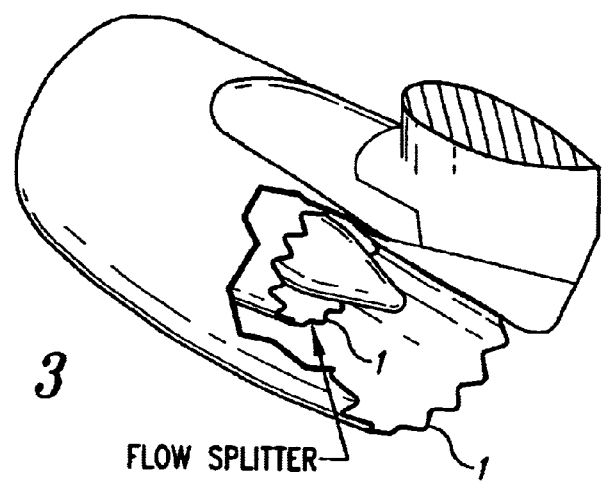
*Fig. 3*
FLOW SPLITTER
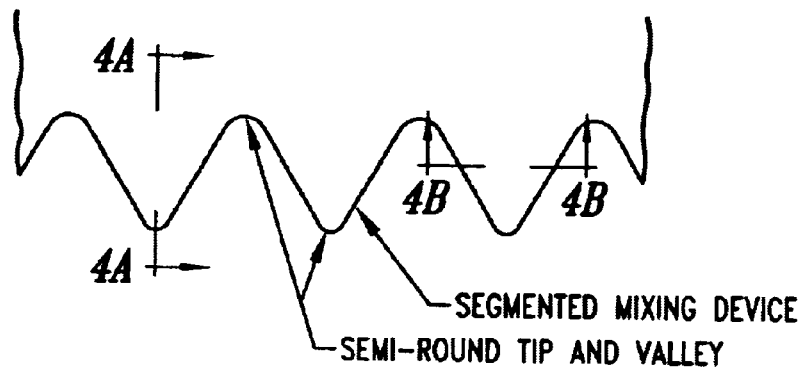
SEGMENTED MIXING DEVICE
SEMI-ROUND TIP AND VALLEY
*Fig. 4*
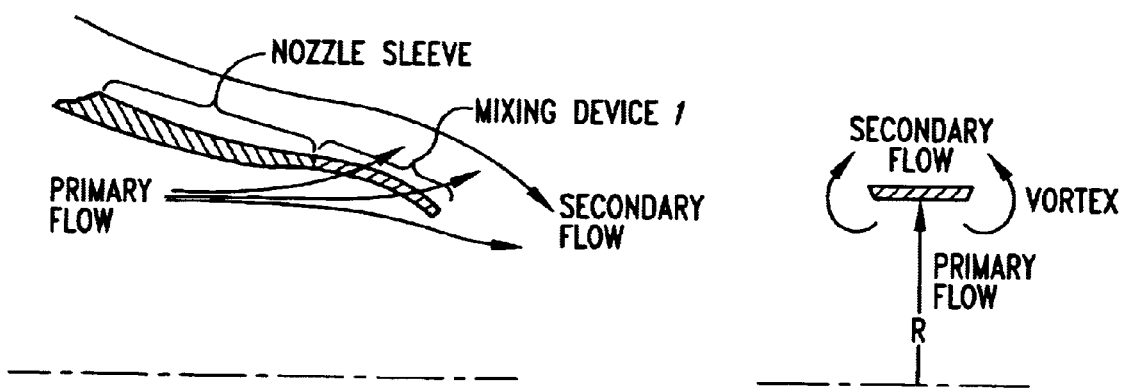
*Fig. 4A*   *Fig. 4B*

SEGMENTED MIXING DEVICE HAVING CHEVRONS FOR EXHAUST NOISE REDUCTION IN JET ENGINES

CROSS-REFERENCE TO RELATED APPLICATIONS

This application claims priority from provisional application serial No. 60/203,222, filed May 5, 2000.

FIELD OF THE INVENTION

Jet engines can produce a high noise level if the velocity of the mass flow exiting the engine is non-uniform and high. For performance considerations, jet engines often have multiple nozzles with the mass flow exiting each nozzle at a different velocity. Since noise radiating from a jet's exhaust increases with the intensity and non-uniformity of the exhaust velocity, jet noise reduction concepts have historically focused on methods for rapidly mixing the flows and achieving a uniform velocity within a short distance of the nozzles.

BACKGROUND OF THE INVENTION

Various flow-mixing devices have been employed in the past to achieve a uniform velocity within a jet's exhaust and to reduce the noise radiated from the exhaust flow. While those devices have been successful at reducing jet noise, the thrust, drag, and weight penalty associated with those devices have often been of a magnitude that the noise at constant aircraft performance has not been reduced. During the NASA Advanced Subsonic Transport (AST) Program (reference 1) sharp pointed, triangular shaped, extensions added to the sleeve of an external plug primary nozzle were tested and were found to reduce jet noise. A. D. Young et al (U.S. Pat. No. 3,153,319, reference 2) also developed extensions that when added to the trailing edge of nozzles reduced jet noise.

The primary difference between the above-described prior art and the hereinafter described invention is the rounding of the upstream intersection of the extensions with the nozzle and the rounding of the extension's trailing edge. Rounding has been found to enhance the reduction of low frequency noise while inhibiting an increase in high frequency noise. Increased high frequency noise has been a characteristic of the previous sharp edged devices even though they have reduced low frequency noise and have had a net acoustic benefit.

BRIEF DESCRIPTION OF THE SEVERAL VIEWS OF THE DRAWING

FIG. 3 is an aircraft jet engine segmented mixing device with mixed flow nacelle;

FIG. 4 is a semi-round tip triangular planform showing of a segmented mixing device nozzle sleeve;

FIG. 4A is a sectional view taken along the lines A—A of FIG. 4 showing in more detail how the outer surface of the mixing device extensions curve inward towards the engine center line;

FIG. 4B is a sectional view taken along the lines B—B of FIG. 4 showing in more detail how the extensions having a planform shape create a streamwise vortex;

DETAILED DESCRIPTION OF THE INVENTION

Figure 1:
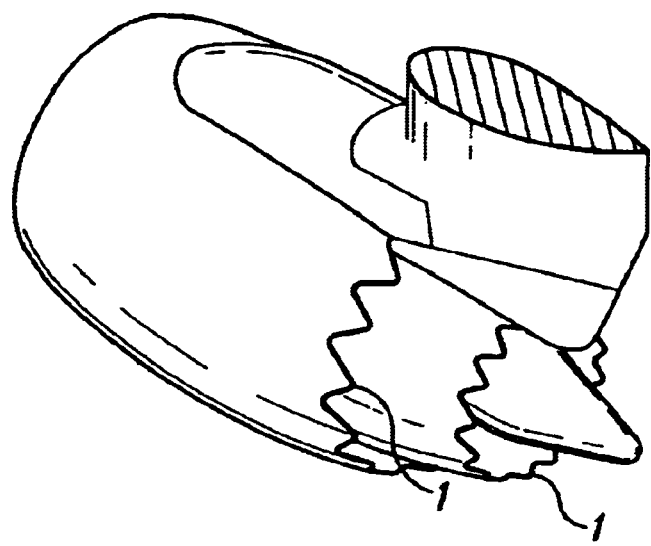
FIG. 1 is a perspective view of a jet engine segmented mixing device with internal plug nacelle.
Figure 2:
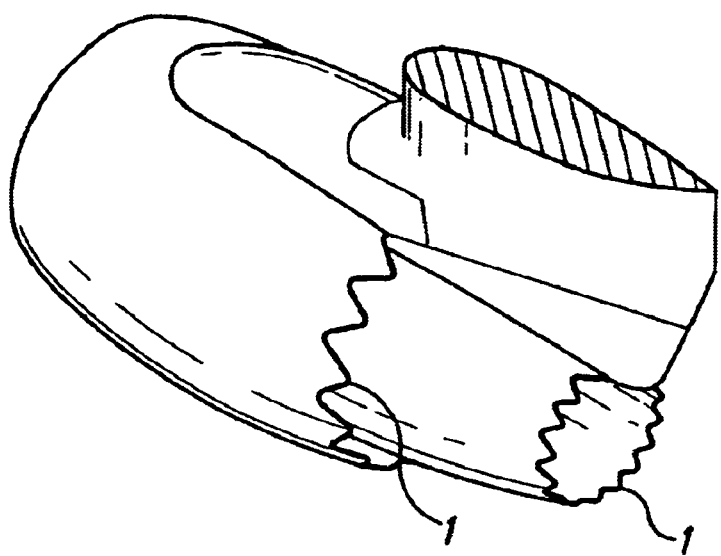
FIG. 2 is illustrative of a jet engine segmented mixing device with internal plug nacelle.
Figure 5:
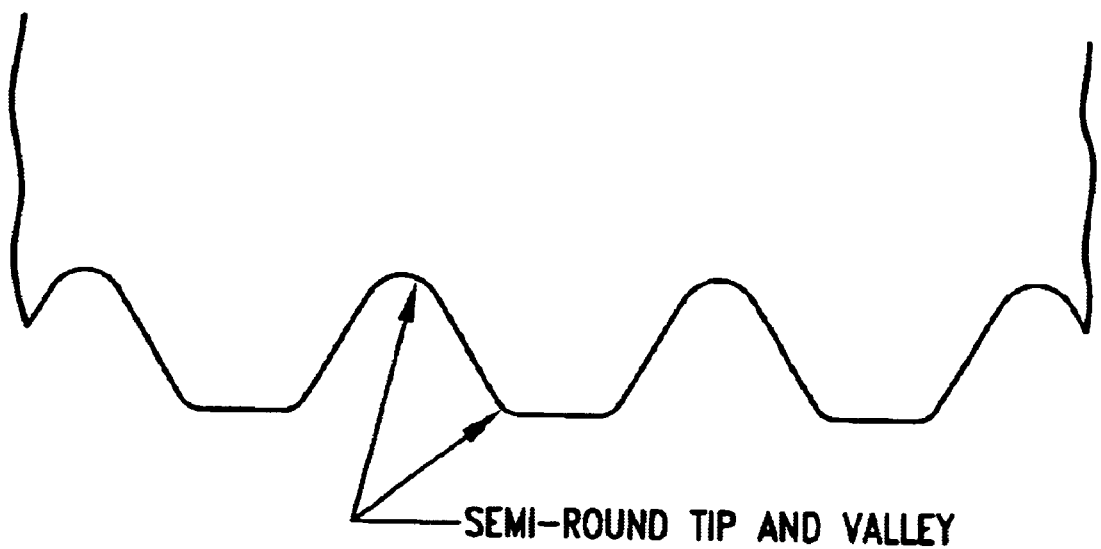
FIG. 5 is further illustrative of the present trapezoidal planform nozzle sleeve; and, FIG. 6 is illustrative of streamwise vortex flow.
Figure 6:
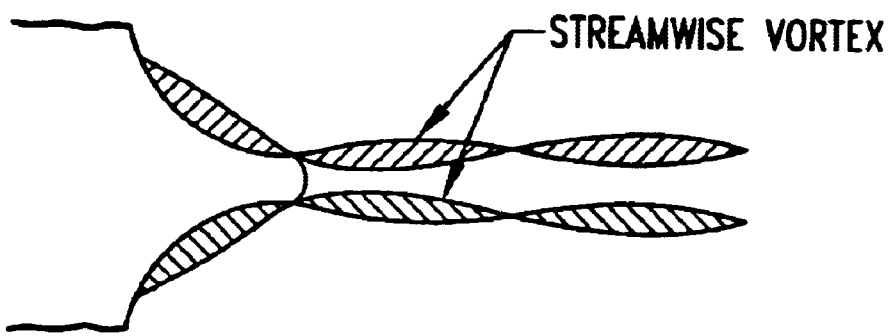

The present invention comprises a segmented mixing device which, when applied to the nozzle of a jet engine, enhances mixing between adjacent flows and reduces the noise radiated from the jet's exhaust flow. The device does so with a very small degradation in aircraft performance. The mixing device is a segmented, triangular or trapezoidal shaped, curved extension 1 to a nozzle's sleeve which results in a serrated trailing edge (see FIGS. 1, 2, and 3). This invention comprises: 1) A modification from the sharp pointed, triangular shaped, nozzle extensions evaluated in the hereinafter referenced NASA AST program to a semi-round, triangular or trapezoidal shaped planform (see FIGS. 4 and 5). 2) An application of the present nozzle extensions to internal and external plug primary nozzles of dual flow exhaust systems (see FIGS. 1 and 2). 3) An application of the nozzle extensions to secondary nozzles of dual flow exhaust systems (see FIGS. 1 and 2). 4) An application of the nozzle extensions to the nozzle of mixed flow exhaust systems and the flow splitter between the primary and secondary streams of those systems (see FIG. 3). And, 5) an application of the nozzle extensions to the trailing edge of any surface separating adjacent flows wherein enhanced mixing is desired.

The purpose of the present nozzle extensions 1 is to enhance the natural free mixing of the exhaust flows and to reduce the acoustic energy associated with the velocity differences between the streams in which they are imbedded. The presently configured nozzle extensions enhance the natural free mixing between adjacent streams by forcing the adjacent flows to penetrate into one another to a greater depth than that achievable with free mixing and therefore results in a more uniform flow in a shorter stream wise distance. The acoustic benefit of the extensions increases as the velocity differences between the streams increase. Two methodologies are employed to enhance mixing: 1) The outer surface of the extensions curve inward towards the engine centerline forcing the secondary (outer) flow into the primary (inner) flow (see FIG. 4, sec A—A). 2) The extensions have a planform shape that creates a stream wise vortex that also enhances rapid mixing of the two streams (see FIG. 4, sec B—B and FIG. 5). Outward turned segments can also be used to enhance mixing. However, the thrust losses for outward turned segments has been greater than for inward turned segments. The present concept however includes rounding to outward turned segments.

Unlike the previous NASA AST configurations and the A. D. Young et al configurations described in U.S. Pat. No. 3,153,319, the extensions defined herein incorporate a planform with semi-rounded intersections with the baseline nozzle and semi-round trailing edges. The purpose of the upstream rounding is to increase the strength of the stream wise vortex by allowing the primary (inner) flow to exit the nozzle sooner and in a more radial manner. Rounding the upstream intersection also eliminates the stress concentrations and low fatigue life of the previous NASA AST and A. D. Young et al concepts. Rounding the extension's trailing edge separates the two stream wise vortexes and increases the circumferential surface area available for the secondary (outer) flow to penetrate the primary (inner) flow. In addition, rounding the trailing edge increases the average turning angle of the secondary flow resulting in greater penetration of the secondary flow into the primary flow and increased mixing of the two flows. Rounding has been found to enhance the reduction of low frequency noise while inhibiting an increase in high frequency noise. The increase in high frequency noise has been a characteristic of the previous designs. The nozzle extensions may vary in length, width, curvature, and count being only constrained by the geometry of the baseline nozzle.

References

1. D. C. Kenzakowski, J. Shipman, S. M. Dash, J. E. Bridges, and N. H. Saiyed, AIAA-2000-0219, "Turbulence Model Study of Laboratory Jets with Mixing Enhancements for Noise Reduction", January 2000.
2. A. D. Young et al, U.S. Pat. No. 3,153,319, "Jet Noise Suppression Means", Oct. 20, 1964.

What is claimed is:

1. A method for reducing noise radiated from a jet engine exhaust flow comprising the steps of:

adding an extension to a gas flow nozzle; and configuring said extension to enhance low frequency noise while inhibiting an increase in high frequency noise.

* * * * *